United States Patent
Cavazza et al.

(10) Patent No.: US 9,527,676 B2
(45) Date of Patent: Dec. 27, 2016

(54) GROUPING METHOD AND UNIT FOR FORMING A LINE OF PRODUCTS ON A PACKING MACHINE

(71) Applicant: G.D SOCIETA' PER AZIONI, Bologna (IT)

(72) Inventors: Luca Cavazza, Bologna (IT); Andrea Biondi, Bologna (IT); Umberto Zanetti, Modena (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 0 days.

(21) Appl. No.: 14/899,960

(22) PCT Filed: Jun. 25, 2014

(86) PCT No.: PCT/IB2014/062603
§ 371 (c)(1),
(2) Date: Dec. 18, 2015

(87) PCT Pub. No.: WO2014/207682
PCT Pub. Date: Dec. 31, 2014

(65) Prior Publication Data
US 2016/0137424 A1 May 19, 2016

(30) Foreign Application Priority Data

Jun. 25, 2013 (IT) .................................. BO13A0325

(51) Int. Cl.
*B65G 47/31* (2006.01)
*B65G 47/08* (2006.01)
(Continued)

(52) U.S. Cl.
CPC .......... *B65G 47/082* (2013.01); *B65G 47/268* (2013.01); *B65G 47/28* (2013.01); *B65G 47/29* (2013.01)

(58) Field of Classification Search
CPC ......... B65G 47/31; B65G 47/29; B65G 47/28; B65G 47/082
(Continued)

(56) References Cited

U.S. PATENT DOCUMENTS 3,482,674 A   12/1969  Wiseman
3,938,650 A *  2/1976  Holt ..................... B65B 35/243
                                                   198/419.3
(Continued)

FOREIGN PATENT DOCUMENTS

EP   0 418 938 A1   3/1991
EP   2 364 916 A1   9/2011
(Continued)

OTHER PUBLICATIONS

International Search Report in International Patent Application No. PCT/IB2014/062603, dated Feb. 10, 2015.

*Primary Examiner* — James R Bidwell
(74) *Attorney, Agent, or Firm* — Marshall, Gerstein & Borun LLP

(57) ABSTRACT

A grouping method and unit for forming a line of products on a packing machine; a first feed conveyor feeds a succession of spaced products along a straight, horizontal grouping path at a first speed; a first compacting conveyor moves a first compacting member along the grouping path, downstream from the first feed conveyor and ahead of a first product in the line, at a second speed slower than the first speed, so as to slow down the first product and compact the intermediate products in the line against the first product; and a second compacting conveyor moves a second compacting member along the grouping path, downstream from the first feed conveyor and behind a last product in the line, at a third speed higher than the first speed, so as to compact the last product against the intermediate products in the line.

11 Claims, 11 Drawing Sheets

(51) Int. Cl.
 *B65G 47/26* (2006.01)
 *B65G 47/28* (2006.01)
 *B65G 47/29* (2006.01)

(58) Field of Classification Search
 USPC .......................................... 198/419.2, 419.3
 See application file for complete search history.

(56) References Cited

U.S. PATENT DOCUMENTS

| | | | | |
|---|---|---|---|---|
| 5,667,055 | A * | 9/1997 | Gambetti | ................ B65B 21/06 |
| | | | | 198/418.7 |
| 7,874,417 | B2 * | 1/2011 | Oppici | ................ B65G 47/841 |
| | | | | 198/419.2 |
| 2013/0220772 | A1 | 8/2013 | Vasse et al. | |
| 2015/0321857 | A1 * | 11/2015 | Sacchetti | .............. B65B 35/405 |
| | | | | 198/419.2 |

FOREIGN PATENT DOCUMENTS

| | | | |
|---|---|---|---|
| FR | 1465357 | A | 1/1967 |
| FR | 2259750 | A1 | 8/1975 |
| JP | H03148420 | A | 6/1991 |
| WO | WO-2012/056140 | A2 | 5/2012 |

* cited by examiner

GROUPING METHOD AND UNIT FOR FORMING A LINE OF PRODUCTS ON A PACKING MACHINE

CROSS-REFERENCE TO RELATED APPLICATIONS

This application is the U.S. national phase of PCT/IB2014/062603, filed Jun. 25, 2014, which claims the benefit of Italian Patent Application No. BO2013A000325, filed Jun. 25, 2013.

TECHNICAL FIELD

The present invention relates to a grouping method and unit for forming a line of products (i.e. a number of products aligned one after another) on a packing machine.

The present invention may be used to advantage to form a line of packages on a so-called 'boxing' machine, i.e. a packing machine for packing loose packages in a cardboard box, to which the following description refers purely by way of example.

BACKGROUND ART

Known package boxing machines comprise an initial grouping unit where a number of lines of successive adjacent individual packages are formed; and a final grouping unit where a number of lines of packages are superimposed to form groups of packages. Downstream from the final grouping unit, a packing unit packs each group of packages into a respective cardboard box.

Known grouping units work well, but have the major drawback of not being very flexible. That is, changing the format of the packages to be grouped or the conformation of the group of packages involves changing several component parts on the packing unit. This is a particularly painstaking, time-consuming job requiring skilled labour, in that, in addition to removing parts and assembling new ones, the packing unit as a whole must be set up to make sure the new parts interact properly with the rest of the unit. This lack of flexibility is an increasingly important issue in view of the general market tendency towards small production lots with frequent changeovers.

Patent Application EP2364916A1 describes a grouping unit for forming a line of products on a packing machine, and which comprises: a first feed conveyor for feeding a succession of products along a grouping path at a first speed; a first compacting conveyor for feeding a first compacting member downstream from the first feed conveyor, along the grouping path, and ahead of the lead product in the line, at a second speed slower than the first, so as to slow down the lead product and compact the intermediate products in the line against the lead product; and a second compacting conveyor for feeding a second compacting member downstream from the first feed conveyor, along the grouping path, and behind the last product in the line, at a third speed higher than the first, so as compact the last product against the intermediate products in the line.

The grouping unit described in Patent Application EP2364916A1 has several drawbacks by requiring an additional auxiliary compacting conveyor, which feeds along the other two compacting conveyors an auxiliary compacting member, which is also movable perpendicular to the grouping path and, for a certain length of time, performs the functions of the first compacting member. The various movements performed by the auxiliary compacting member make the auxiliary compacting conveyor extremely complicated to produce and control.

DESCRIPTION OF THE INVENTION

It is an object of the present invention to provide a grouping method and unit for forming a line of products on a packing machine, designed to eliminate the above drawbacks (i.e. which are highly flexible) and which at the same time are cheap and easy to implement.

According to the present invention, there are provided a grouping method and unit for forming a line of products on a packing machine, as claimed in the accompanying Claims.

BRIEF DESCRIPTION OF THE DRAWINGS

A non-limiting embodiment of the present invention will be described by way of example with reference to the attached drawings, in which.

PREFERRED EMBODIMENTS OF THE INVENTION

Figure 1:
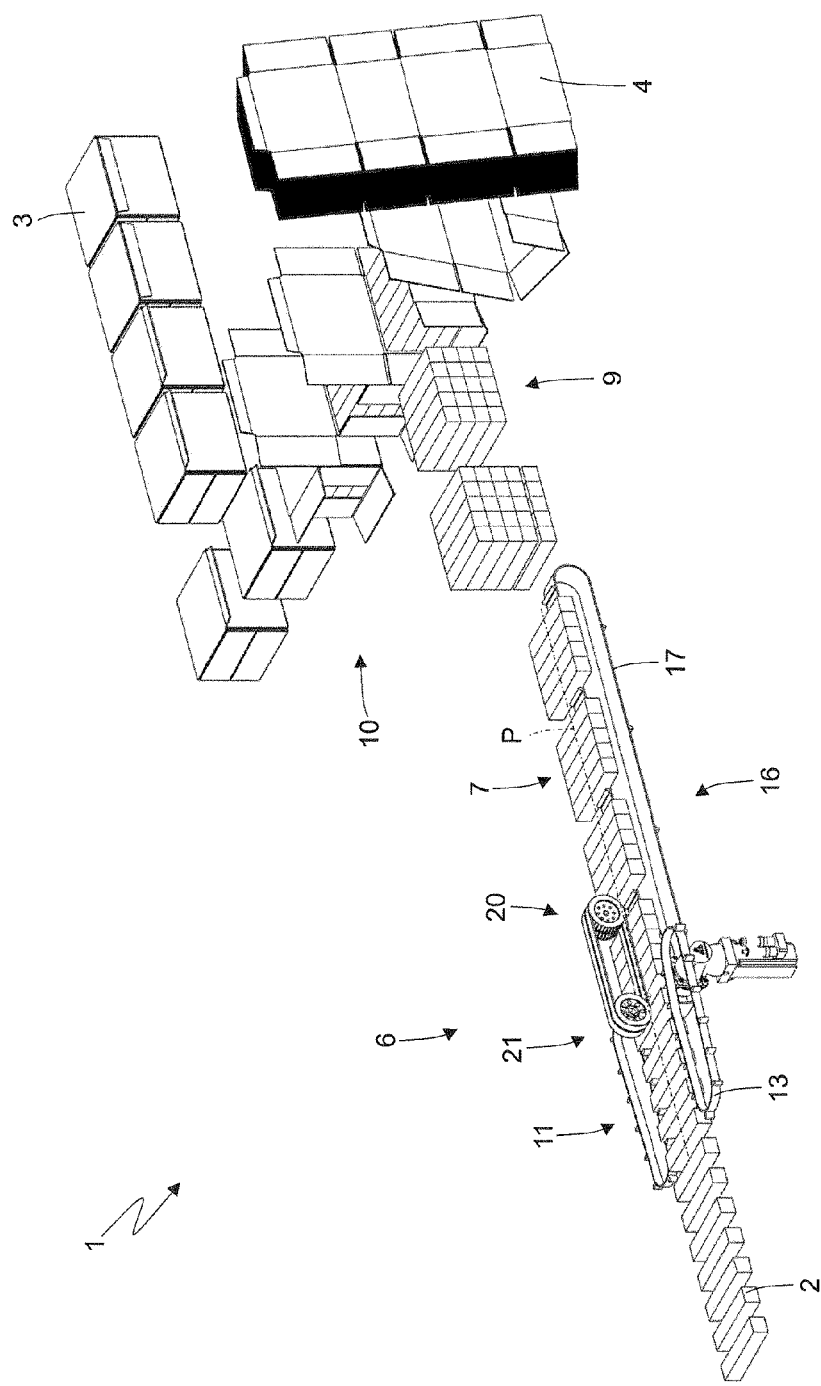
FIG. 1 shows a schematic view in perspective of a packing machine for packing loose packages in a cardboard box.
Figure 2:
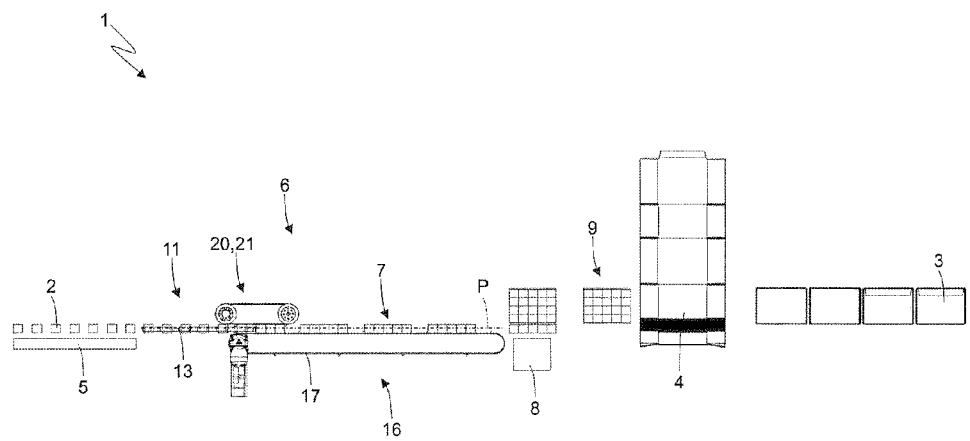
FIG. 2 shows a front view of the FIG. 1 packing machine.

Number 1 in FIGS. 1 and 2 indicates as a whole a packing (i.e. boxing) machine for packing loose packages 2 in a cardboard box 3 formed by folding and gluing a blank 4.

Packing machine 1 comprises an input conveyor 5 (shown schematically in FIG. 2) which is fed by an upstream packing machine (not shown) with a succession of spaced packages 2 (i.e. equally spaced a given distance apart), and feeds the succession of spaced packages 2 forward continuously (i.e. at constant speed). Downstream from input conveyor 5, an initial grouping unit 6 forms a number of lines 7 of successive adjacent individual packages 2. Downstream from initial grouping unit 6, a final grouping unit 8 (shown schematically in FIG. 2) superimposes a number of lines 7 of packages to form groups 9 of packages 2. And downstream from final grouping unit 8, a packing unit 10 (shown schematically in FIG. 1) packs each group 9 of packages 2 inside a respective cardboard box 3.

Figure 3:
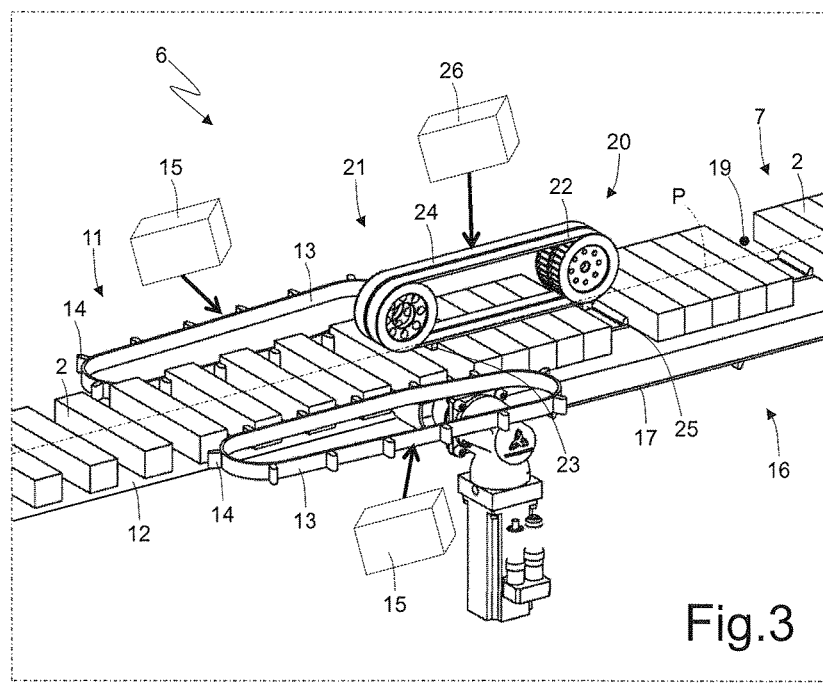
FIG. 3 shows a larger-scale detail of FIG. 1, showing an initial grouping unit in accordance with the present invention.

As shown in FIG. 3, initial grouping unit 6 comprises a feed conveyor 11 which receives the succession of spaced packages 2 (i.e. equally spaced a given distance apart) from input conveyor 5, and feeds the succession of spaced packages 2 continuously along a straight, horizontal grouping path P at a constant speed V1 (which obviously depends on the output rate of packing machine 1). Feed conveyor 11 comprises a fixed supporting surface 12 (FIG. 3) on which packages 2 slide along grouping path P; and two conveyor belts 13 which are located on opposite sides of grouping path P, engage two opposite ends of each package 2, and together push packages 2 along grouping path P. Each conveyor belt 13 is positioned vertically, is looped about two end pulleys (one of which is powered), and has a number of projections 14 which project from conveyor belt 13 perpendicularly to grouping path P, and rest against the rear (in the travelling direction along grouping path P) of respective packages 2 to push packages 2 from behind along grouping path P.

In a preferred embodiment shown in FIG. 3, the two conveyor belts 13 of feed conveyor 11 are mounted to move horizontally in opposite directions, to adjust the distance between the two conveyor belts 13 to the format (i.e. size) of packages 2. For example, the two conveyor belts 13 may be mounted on respective slides connected to each other to move equally and in opposite directions with respect to each other. Obviously, the two conveyor belts 13 of feed conveyor 11 can only be moved horizontally in opposite directions when packing machine 1 is off and empty, i.e. during a format changeover to adapt packing machine 1 to packages 2 of a different format (i.e. size). More specifically, when working with longer or shorter packages 2, the distance between the two conveyor belts 13 is adjusted to always equal the length of packages 2 (obviously, allowing for the necessary tolerances). In one possible embodiment, the two conveyor belts 13 are translated horizontally by hand (by pushing manually on the supports of conveyor belts 13, or by rotating a handwheel); in a preferred embodiment shown in FIG. 3, horizontal translation of each conveyor belt 13 is controlled by an electric actuating device 15 feedback-controlled by a position sensor.

As shown in FIG. 3, initial grouping unit 6 comprises a feed conveyor 16 located directly downstream from feed conveyor 11 and therefore fed by feed conveyor 11 with packages 2. Feed conveyor 16 feeds packages 2 continuously along grouping path P at the same constant speed V1 (which obviously depends on the output rate of packing machine 1) as feed conveyor 11. It is important to note that the travelling speed V1 of feed conveyor 16 is identical to the travelling speed V1 of feed conveyor 11, i.e. both feed conveyors 11 and 16 normally travel at the same speed. Feed conveyor 16 comprises a horizontal conveyor belt 17 looped about two end pulleys (one of which is powered). Feed conveyor 16 is therefore located beneath grouping path P. That is, feed conveyor is located beneath packages 2 resting on conveyor belt 17. Conveyor belt 17 has a number of projections 18 which project from conveyor belt 17 perpendicularly to grouping path P, and rest against the rear (in the travelling direction along grouping path P) of respective packages 2 to push packages 2 from behind along grouping path P. Projections 18 on conveyor belt 17 define a succession of pockets 19, each of which, in the direction of grouping path P, is larger than a line 7 of packages 2.

As shown in FIG. 3, initial grouping unit 6 comprises two identical (i.e. structurally identical) side by side compacting conveyors 20 and 21. The two compacting conveyors 20 and 21 are located over grouping path P and feed conveyor 16, and are therefore positioned facing and opposite feed conveyor 16. In other words, a 'channel', along which packages 2 travel, is defined between feed conveyor 16 beneath grouping path P, and compacting conveyors 20 and 21 over grouping path P.

This allows packages 2 to be grouped without toppling over as they are slowed down by compacting conveyor 20, while feed conveyor 16 continues travelling at constant speed.

Compacting conveyor 20 comprises a horizontal conveyor belt 22 looped about two end pulleys (one of which is powered) and located over grouping path P, i.e. over packages 2 resting on conveyor belt 17 of feed conveyor 16. Conveyor belt 22 has one projection 23 which defines a compacting member 23, projects from conveyor belt 22 perpendicularly to grouping path P, and rests on the front/rear (in the travelling direction along grouping path P) of packages 2 to brake/push packages 2 from the front/rear along grouping path P. Compacting conveyor 20 feeds projection 23 continuously along grouping path P at a variable speed V2 (as described below). In a different but perfectly equivalent embodiment not shown, conveyor belt 22 has two or more projections 23.

Compacting conveyor 21 (which is structurally identical to compacting conveyor 20) comprises a horizontal conveyor belt 24 looped about two end pulleys (one of which is powered) and located over grouping path P, i.e. over packages 2 resting on conveyor belt 17 of feed conveyor 16. Conveyor belt 24 has one projection 25 which defines a compacting member 25, projects from conveyor belt 24 perpendicularly to grouping path P, and rests on the front/rear (in the travelling direction along grouping path P) of packages 2 to brake/push packages 2 from the front/rear along grouping path P. Compacting conveyor 21 feeds projection 25 continuously along grouping path P at a variable speed V3 (as described below). In a different but perfectly equivalent embodiment not shown, conveyor belt 24 has two or more projections 25.

As described in detail below, feed conveyor 16 engages packages 2 simultaneously with compacting members 23 and 25 of compacting conveyors 20 and 21 respectively.

Feed conveyor 16 therefore feeds the packages along grouping path P, while compacting members 23 and 25 group packages 2 with no change in the travelling direction of the packages.

More specifically, feed conveyor 16 feeds packages 2 up to final grouping unit 8 with no alteration in its path, thus minimizing the need for further devices for transferring groups 9.

Maintaining the travelling direction of feed conveyor 16, even when forming groups 9, therefore minimizes slippage of packages 2, and prevents damage to packages 2 as they are grouped and/or as groups 9 are subsequently fed to grouping unit 8.

More specifically, feed conveyor 16 has a number of pockets 19, each of which, in the direction of grouping path P, is larger than a line 7.

The extra size of pockets 19 therefore defines the necessary space in which to group packages 2 and, at the same time, to separate groups 9.

Figure 4:
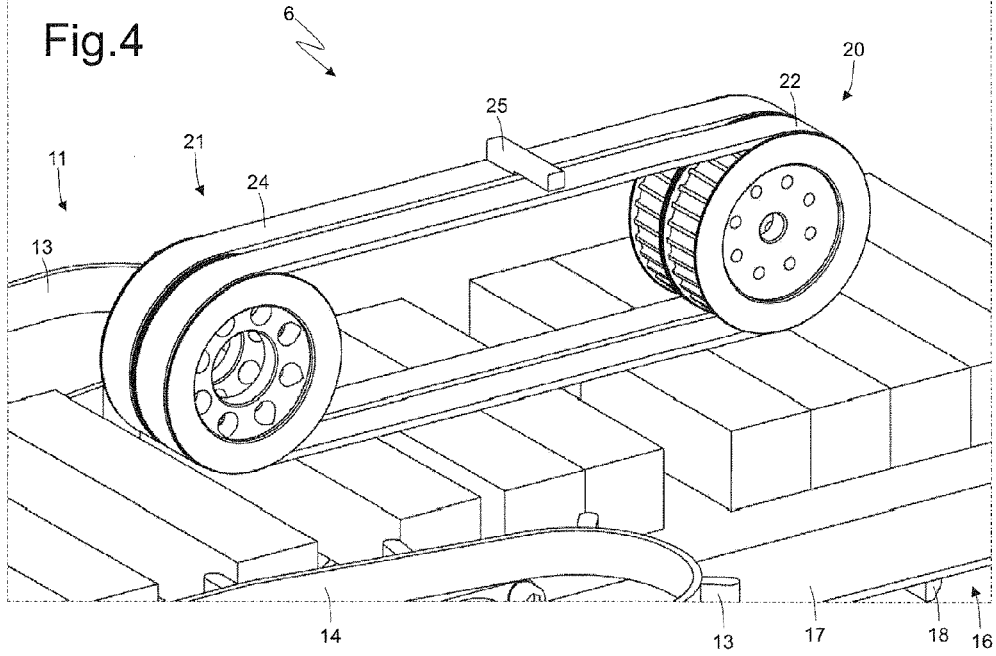
FIG. 4 shows a larger-scale detail of FIG. 3, showing two initial compacting conveyors of the FIG. 4 grouping unit.

In a preferred embodiment shown in FIG. 4, each compacting member 23, 25 is wider than its respective compacting conveyor 20, 21. In other words, each compacting member 23, 25 is only fitted to its respective compacting conveyor 20, 21, but, being wider than its respective compacting conveyor 20, 21, also extends over (without contacting) the other compacting conveyor 21, 20. This makes it possible to increase the width, i.e. the transverse dimension, of compacting members 23, 25, so that they engage packages 2 centrally (i.e. perfectly symmetrically).

In a preferred embodiment shown in FIG. 3, both conveyor belts 22 and 24 of compacting conveyors 20 and 21 are fitted to the same support, which is movable vertically to adjust the position of compacting conveyors 20 and 21 to the format (i.e. size) of packages 2. Obviously, the two conveyor belts 22 and 24 of compacting conveyors 20 and 21 can only be moved vertically when packing machine 1 is off and empty, i.e. during a format changeover to adapt packing machine 1 to packages 2 of a different format (i.e. size). More specifically, when working with thicker or thinner packages 2, the distance between conveyor belts 22, 24 of compacting conveyors 20, 21 and conveyor belt 17 of feed conveyor 16 is adjusted to always equal the thickness of packages 2 (obviously, allowing for the necessary tolerances). In one possible embodiment, conveyor belts 22 and 24 of compacting conveyors 20 and 21 are translated vertically by hand (by pushing manually on the supports of conveyor belts 22 and 24, or by rotating a handwheel); in a preferred embodiment shown in FIG. 3, vertical translation of conveyor belts 22 and 24 of compacting conveyors 20 and 21 is controlled by an electric actuating device 26 feedback-controlled by a position sensor.

Operation of initial grouping unit 6 to form a line 7 of five adjacent packages 2 will now be described with reference to FIGS. 5-11. As shown in FIG. 11, line 7 comprises a first or lead package 2a, three intermediate packages 2b, and a last or end package 2c.

Figure 5:
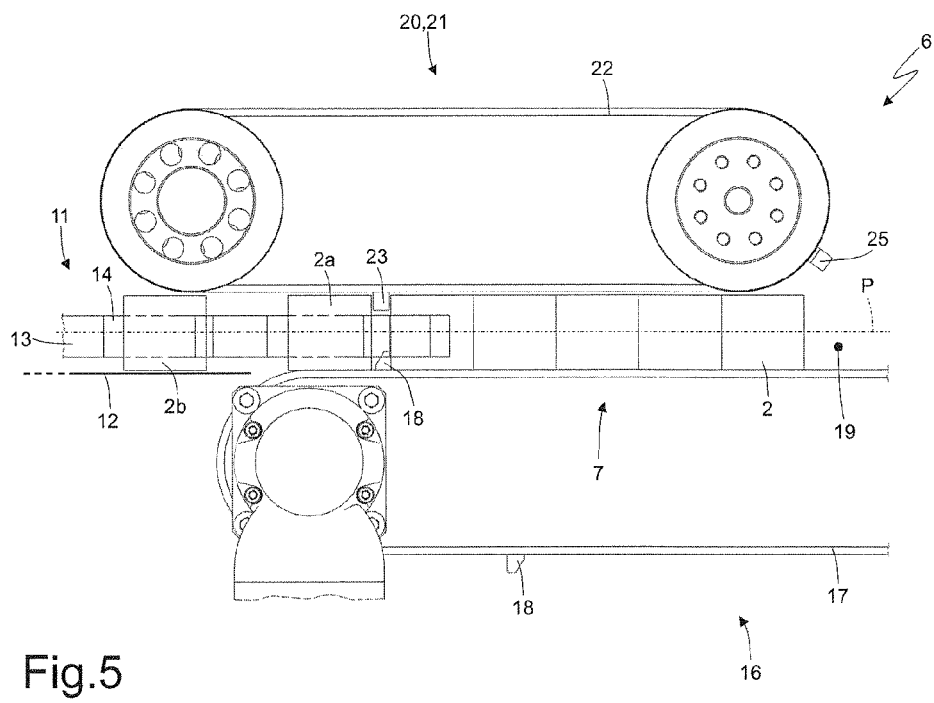
FIGS. 5-11 show seven views of part of the FIG. 3 initial grouping unit at successive operating stages in the formation of a line of packages (i.e. a number of packages aligned one after another).
Figure 6:
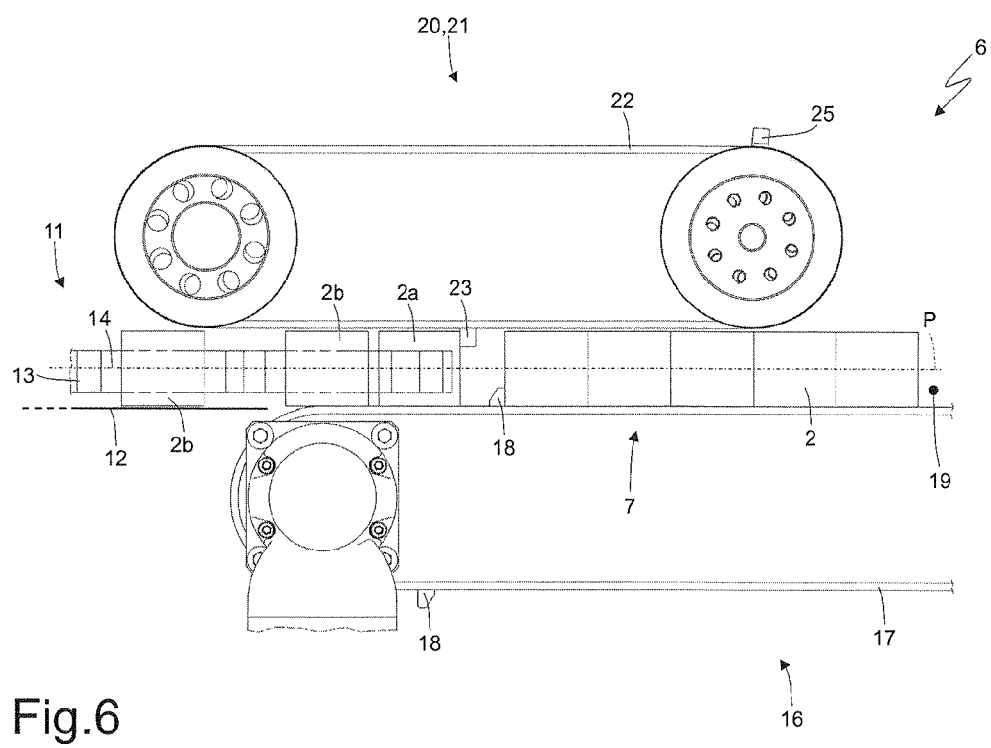
Figure 7:
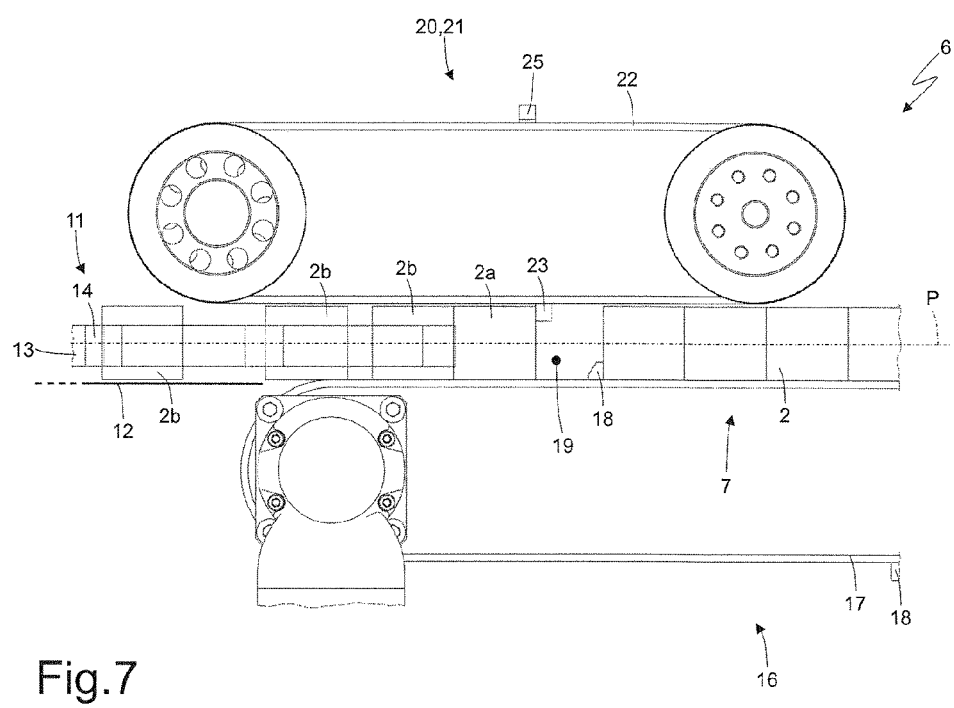
Figure 8:
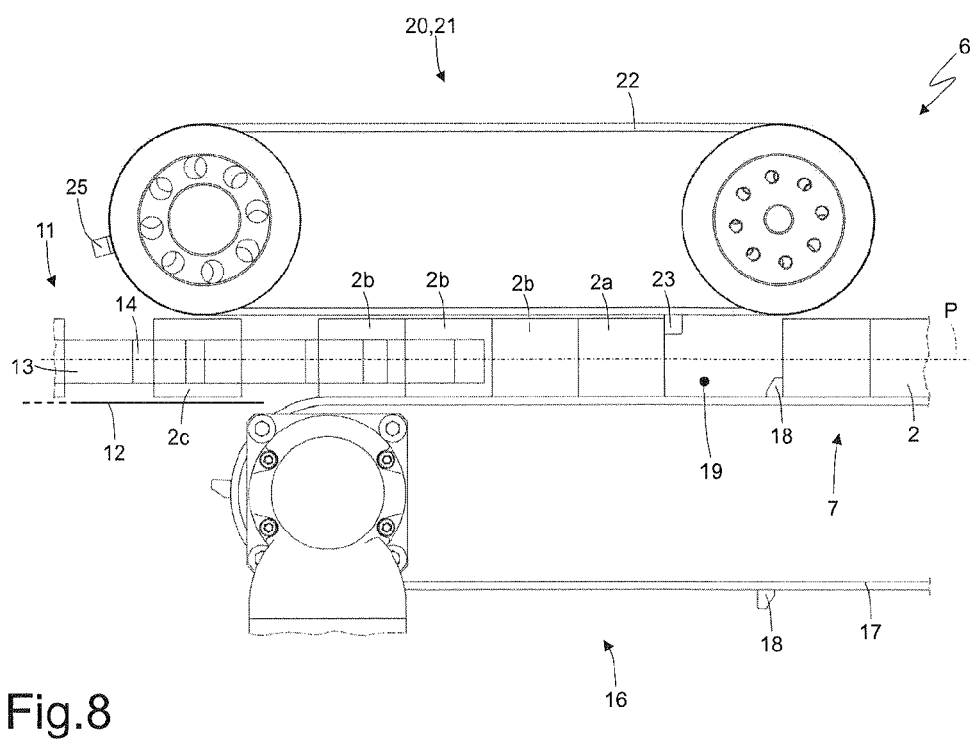

As shown in FIG. 5, the succession of packages 2 spaced along grouping path P is advanced by feed conveyor 11 at speed V1, and is transferred, still at speed V1, from feed conveyor 11 to feed conveyor 16, on which packages 2 rest on conveyor belt 17, inside a pocket 19. As stated, both feed conveyors 11 and 16 travel at the same speed, so packages 2 are transferred easily from feed conveyor 11 to feed conveyor 16. When the first package 2a in line 7 arrives on conveyor belt 17 of feed conveyor 16, compacting member 23 (i.e. projection 23 on compacting conveyor 20) is moved along grouping path P, ahead of first package 2a in line 7, at a speed V2 lower than speed V1, to slow down first package 2a and so gradually compact the intermediate packages 2b in line 7 against first package 2a. FIGS. 6-8 clearly show the formation of line 7 by gradually compacting intermediate packages 2b in line 7 against first package 2a slowed down by compacting member 23 travelling at speed V2 lower than speed V1. Obviously, at this stage, first package 2a and intermediate packages 2b in line 7 slide with respect to conveyor belt 17 of feed conveyor 16, which continues moving at the same speed V1 as feed conveyor 11.

Figure 9:
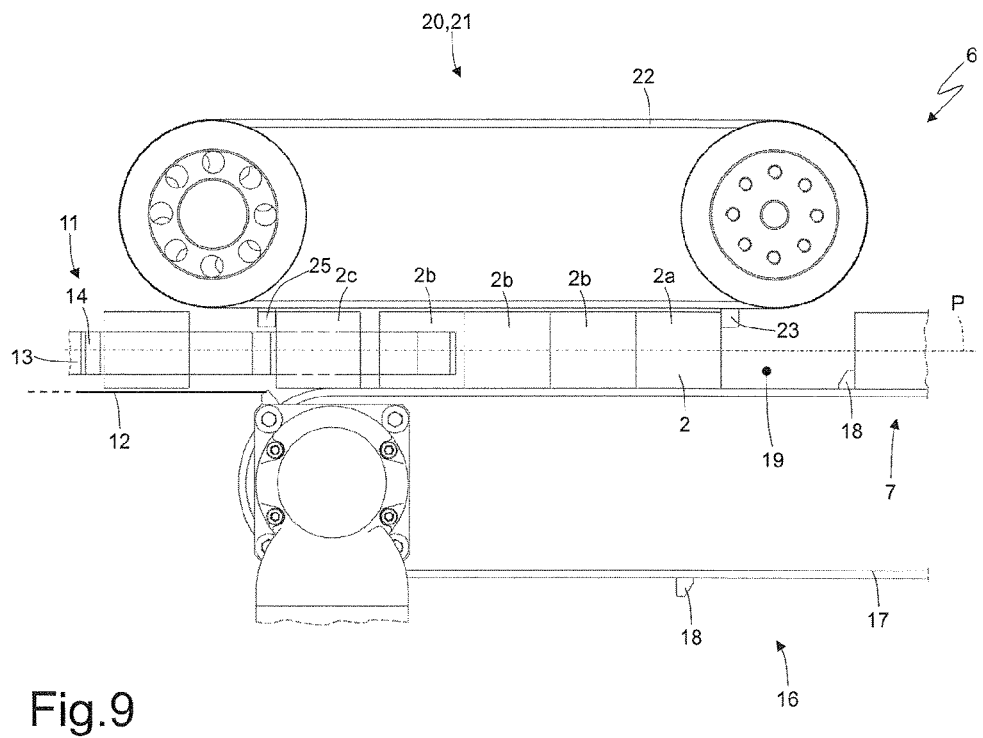
Figure 10:
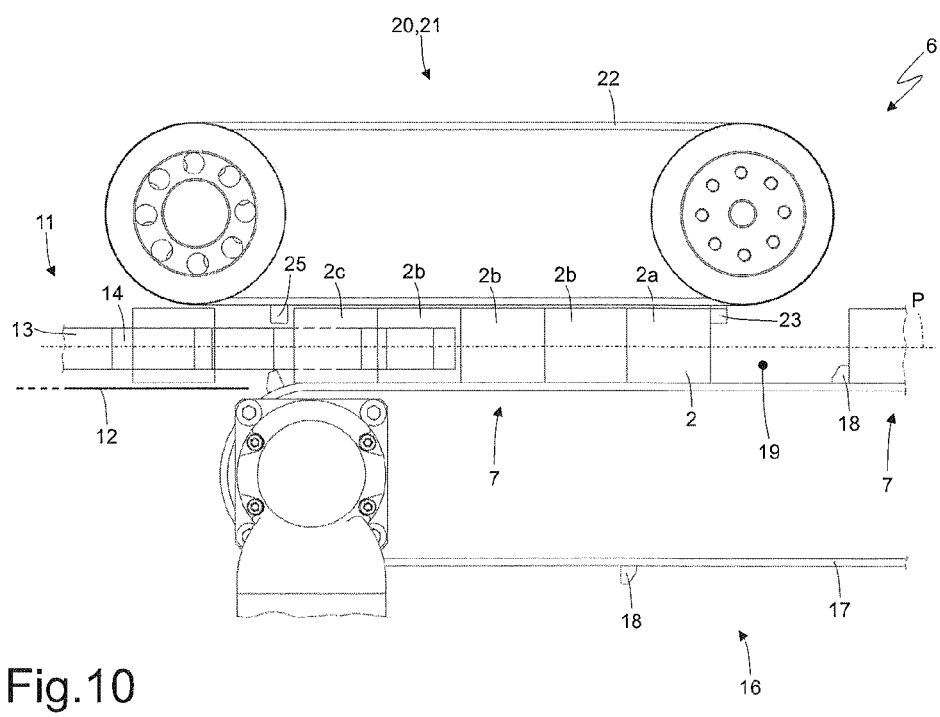
Figure 11:
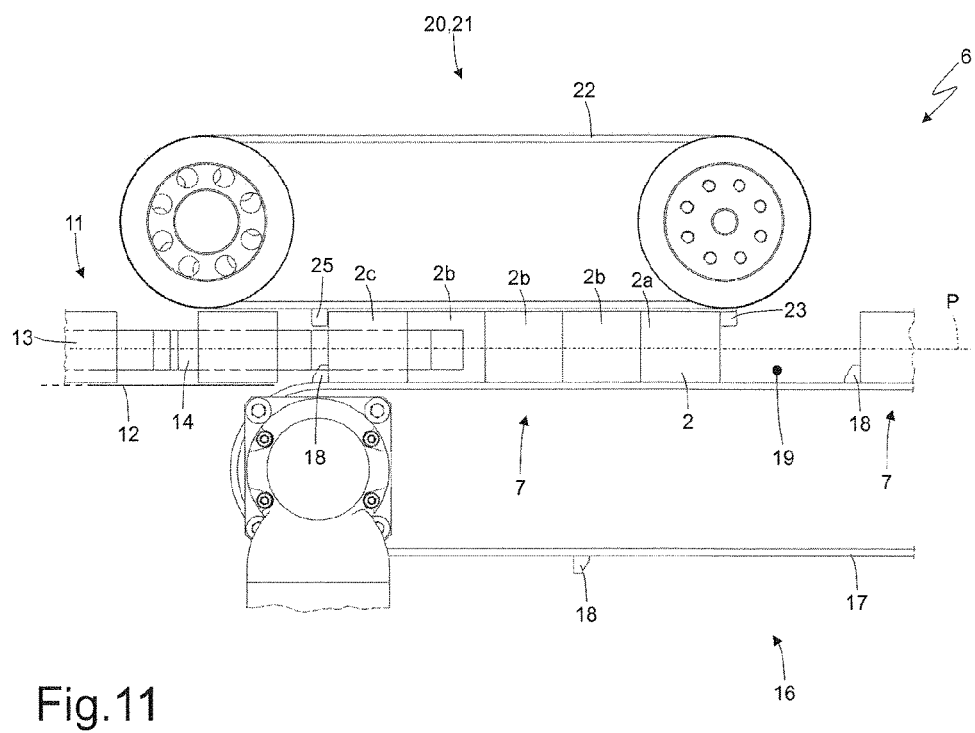

As shown in FIGS. 8-10, compacting member 25 (i.e. projection 25 on compacting conveyor 21) is moved along grouping path P, behind the last package 2c in line 7, at a speed V3 higher than speed V1, so as to compact the last package 2c against intermediate packages 2b in line 7. In other words, compacting member 25 pushes the last package 2c to accelerate it and so compact it against intermediate packages 2b in line 7. Obviously, at this stage, last package 2c slides with respect to conveyor belt 17 of feed conveyor 16, which continues moving at the same speed V1 as feed conveyor 11.

As shown in FIGS. 10 and 11, once line 7 is completed (i.e. once last package 2c is compacted against intermediate packages 2b in line 7), compacting member 23 (i.e. projection 23 on compacting conveyor 20) is moved along grouping path P, ahead of first package 2a in line 7, at a speed V2 equal to speed V1, and, at the same time, a projection 18 on feed conveyor 16 (still travelling at speed V1) engages the rear of line 7 (i.e. rests against last package 2c in line 7). Once the rear of line 7 is engaged by projection 18 on feed conveyor 16 (still travelling at speed V1), compacting member 25 (i.e. projection 25 on compacting conveyor 21) slows down to a speed V3 lower than sped V1 to commence forming the next line 7. It is important to note that, to form the next line 7, compacting members 23 and 25 swap functions: to form the current line 7, compacting member 23 slows down first package 2a in line 7, and compacting member 25 accelerates last package 2c in line 7; whereas, to form the next line 7, compacting member 23 accelerates last package 2c in line 7, and compacting member 25 slows down first package 2a in line 7. In other words, whenever a line 7 is completed, the functions of compacting members 23 and 25 are reversed: to form a first line 7, compacting member 23 contacts the first package 2a in the first line 7, and compacting member 25 contacts the last package 2c in the first line 7; and, to form a second line 7 following first line 7, compacting member 23 contacts the last package 2c in the second line 7, and compacting member 25 contacts the first package 2a in the second line 7.

In a preferred embodiment, if a 'gap' is formed in the succession of spaced packages 2 on feed conveyor 11 (i.e. in the event of a missing package 2, typically due to rejection of a flawed package 2 upstream from feed conveyor 11), conveyors 16, 20 and 21 downstream from feed conveyor 11 are temporarily slowed down accordingly to close the 'gap'.

Initial grouping unit 6 described has numerous advantages.

Firstly, initial grouping unit 6 described is highly flexible, i.e. provides for quickly changing both the number of packages 2 in each line 7, and the format (i.e. size) of individual package 2. The number of packages 2 in each line 7 can be changed by simply appropriately altering the laws of motion (i.e. the time pattern of speeds V2 and V3) of compacting conveyors 20 and 21, without changing or adjusting any actual component parts of grouping unit 6. In other words, the number of packages 2 in each line 7 can be changed by simply making software adjustments to a control unit of initial grouping unit 6. The format (i.e. size) of individual packages 2 can be changed (as described clearly above) by simply moving the two conveyor belts 13 of feed conveyor 11 horizontally and/or (as described clearly above) by simply moving the two conveyor belts 22, 24 of compacting conveyors 20, 21 vertically. In this case, too, no actual component parts of initial grouping unit 6 are changed, and, thanks to actuating devices 15 and 26, the whole operation can be carried out with no manual labour on the part of the operator.

Secondly, initial grouping unit 6 described is also cheap and easy to produce.

Finally, initial grouping unit 6 described enables extremely high output rates, even as many as 1000 packages 2 a minute, to be achieved, by treating packages 2 'gently', i.e. not subjecting them to severe mechanical stress (i.e. sharp acceleration/deceleration).

The invention claimed is:

1. A grouping method for forming a line (7) of products (2) on a packing machine (1); the grouping method comprising the steps of:
feeding a succession of spaced products (2) on a first feed conveyor (11) along a straight, horizontal grouping path (P) at a constant first speed (V1) to form the line (7), the line comprising one or more intermediate products (2b) disposed between a first product (2a) and a last product (2b);
moving a first compacting member (23) of a first compacting conveyor (20) along the grouping path (P), downstream from the first feed conveyor (11) and ahead of the first product (2a) in the line (7), at a second speed (V2) slower than the first speed (V1), so as to slow down the first product (2a) and compact the one or more intermediate products (2b) in the line (7) against the first product (2a);
moving a second compacting member (25) of a second compacting conveyor (21) along the grouping path (P), downstream from the first feed conveyor (11) and behind the last product (2c) in the line (7), at a third speed (V3) higher than the first speed (V1), so as to compact the last product (2c) against the one or more intermediate products (2b) in the line (7); and feeding along the grouping path (P), directly downstream from the first feed conveyor (11), a second feed conveyor (16) which receives the products (2) directly from the first feed conveyor (11), and feeds the products (2) continuously along the grouping path (P) at the same constant first speed (V1) as the first feed conveyor (11);

wherein the second feed conveyor (16) is located beneath the grouping path (P); and said first (20) and second (21) compacting conveyor are located over the grouping path (P), facing and opposite the second feed conveyor (16), to form a channel along which said products (2) travel;

wherein the starting point of the second feed conveyor (16) is arranged along the grouping path (P) downstream from the starting points of the first compacting conveyor (20) and of the second compacting conveyor (21);

wherein the second feed conveyor (16) extends along the grouping path (P) beyond the first compacting conveyor (20) and the second compacting conveyor (21);

wherein the second feed conveyor (16) engages said products (2) simultaneously with both of said compacting members (23, 25); and wherein the second feed conveyor (16) has a number of pockets (19), each pocket has a length in the direction of said grouping path (P) that is greater than a length in the direction of said grouping path (P) of the line (7).

2. A grouping method as claimed in claim 1, wherein, after each line (7) is formed, the functions of the first compacting member (23) and the second compacting member (25) are reversed, so that, to form a first line (7), the first compacting member (23) is positioned contacting the first product (2a) in the first line (7), and the second compacting member (25) is positioned contacting the last product (2c) in the first line (7), and, to form a second line (7) following the first line (7), the first compacting member (23) is positioned contacting the last product (2c) in the second line (7), and the second compacting member (25) is positioned contacting the first product (2a) in the second line (7).

3. A grouping method as claimed in claim 1, wherein the first compacting member (23) is moved by a first compacting conveyor (20), and the second compacting member (25) is moved by a second compacting conveyor (21) independent of and separate from the first compacting conveyor (20).

4. A grouping method as claimed in claim 3, wherein:
the first and second compacting conveyors (20, 21) are identical and located side by side; and
each compacting member (23, 25) is wider than its respective compacting conveyor (20, 21).

5. A grouping method as claimed in claim 3, wherein the first and second compacting conveyors (20, 21) are located above the grouping path (P).

6. A grouping method as claimed in claim 5, further comprising moving the first and second compacting conveyors (20, 21) vertically to adjust the position of the first and second compacting conveyors (20, 21) to the size of the products (2).

7. A grouping method as claimed in claim 1, wherein the first feed conveyor (11) comprises two conveyor belts (13) located on opposite sides of the grouping path (P).

8. A grouping method as claimed in claim 7, and comprising the further step of moving the two conveyor belts (13) horizontally in opposite directions to adjust the distance between the two conveyor belts (13) to the size of the products (2).

9. A grouping method as claimed in claim 1, wherein the second feed conveyor (16) is located on the opposite side of the grouping path (P) with respect to the compacting members (23, 25).

10. A grouping method as claimed in claim 1, wherein the second feed conveyor (16) comprises a conveyor belt (17) located beneath the grouping path (P), and which has a number of projections (18) perpendicular to the grouping path (P).

11. A grouping unit (6) for forming a line (7) of products (2) on a packing machine (1); the grouping unit (6) comprising:
a first feed conveyor (11) for feeding a succession of spaced products (2) along a straight, horizontal grouping path (P) at a constant first speed (V1) to form the line (7), the line comprising one or more intermediate products (2b) disposed between a first product (2a) and a last product (2b);

a first compacting conveyor (20) for moving a first compacting member (23) along the grouping path (P), downstream from the first feed conveyor (11) and ahead of the first product (2a) in the line (7), at a second speed (V2) slower than the first speed (V1), so as to slow down the first product (2a) and compact the one or more intermediate products (2b) in the line (7) against the first product (2a); and a second compacting conveyor (21) for moving a second compacting member (25) along the grouping path (P), downstream from the first feed conveyor (11) and behind the last product (2c) in the line (7), at a third speed (V3) higher than the first speed (V1), so as to compact the last product (2c) against the one or more intermediate products (2b) in the line (7); and a second feed conveyor (16), which is arranged directly downstream from the first feed conveyor (11) and along the grouping path (P), receives the products (2) directly from the first feed conveyor (11), and feeds the products (2) continuously along the grouping path (P) at the same constant first speed (V1) as the first feed conveyor (11);

wherein said second feed conveyor (16) is located beneath the grouping path (P); and said first (20) and second (21) compacting conveyor are located over the grouping path (P), facing and opposite said second feed conveyor (16);

wherein the starting point of the second feed conveyor (16) is arranged along the grouping path (P) downstream from the starting points of the first compacting conveyor (20) and of the second compacting conveyor (21);

wherein the second feed conveyor (16) extends along the grouping path (P) beyond the first compacting conveyor (20) and the second compacting conveyor (21);

wherein said second feed conveyor (16) engages the products (2) simultaneously with both of the compacting members (23, 25); and wherein said second feed conveyor (16) has a number of pockets (19), and each pocket has a length in the direction of the grouping path (P) that is greater than a length in the direction of said grouping path (P) of the line (7).

* * * * *